UNITED STATES PATENT OFFICE 2,485,160

PROCESS FOR THE EPOXIDATION OF ESTERS OF OLEIC AND LINOLEIC ACIDS

Warren D. Niederhauser and Joseph E. Koroly, Philadelphia, Pa., assignors to Röhm & Haas Company, Philadelphia, Pa., a corporation of Delaware No Drawing. Application October 23, 1948,
Serial No. 56,262

8 Claims. (Cl. 260—348)

This invention relates to a process of epoxidizing esters of oleic and linoleic acids. It relates to a process wherein esters of oleic and linoleic acids are reacted with hydrogen peroxide and formic acid in such a way that oxirane rings or epoxy groups

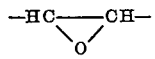

are formed across the double bonds in the acid portion of the ester.

Heretofore epoxidized esters of oleic and linoleic acids have been prepared on a small scale by the reaction of the fatty acid esters with peracetic acid or with mixtures of acetic acid and hydrogen peroxide. That method, however, is dangerous when employed on a large or commercial scale. The process of this invention, on the other hand, is safe on a large scale, can be employed commercially, and is at the same time more economical than previous methods. The art shows also that performic acid has been reacted with oleates and linoleates heretofore but in such instances the products have invariably been dihydroxy or hydroxyformoxy derivatives of the esters rather than the epoxides thereof.

The epoxy derivatives of the esters of oleic and linoleic acids are particularly suitable as plasticizers for many organic film-forming and molding materials such as polyvinyl chloride and its copolymers. They are also excellent scavengers for acids, such as hydrochloric acid, which are present or may form in such film-forming materials and which cause deterioration thereof. This invention, therefore, which furnishes the epoxidized esters is of increasing commercial value.

The process comprises reacting, at temperatures from 10° C. to 100° C. and preferably from 20° C. to 75° C., the esters of oleic and linoleic acid with a mixture of hydrogen peroxide and formic acid. The ratio of these two reactants to the ester is most critical. Performic acid is always present in equilibrium in a mixture of hydrogen peroxide and formic acid and it is believed that this performic acid is responsible for the epoxidation of the double bonds in the acid portion of the ester; that is, for the formation of the epoxide group or oxirane ring in the ester. During epoxidation the performic acid is reconverted to formic acid which then again reacts with the hydrogen peroxide to form more performic acid which further epoxidizes the ester. This process continues until the hydrogen peroxide is consumed or until the ester is fully epoxidized. The maximum amount of formic acid which is used is one mole for each double bond in each mole of esterified acid. That is to say, the maximum amount of formic acid which is employed is one mole for each mole of unsaturation in the ester of oleic acid and/or linoleic acid. It is, however, most desirable and advantageous to use less than this maximum ratio of formic acid; and ratios of 0.25 to 0.75, and preferably ratios between 0.25 and 0.5 mole per mole of unsaturation are recommended. These lower ratios are recommended not only for reasons of economy but because the higher ratios of formic acid make for the formation of by-products, particularly the dihydroxy and hydroxyformoxy derivatives of the ester which do not have the value of the epoxy derivatives and which it is the purpose of this invention to avoid.

The amount of hydrogen peroxide which is employed should be at least one mole for each double bond in each mole of esterified acid. This minimum amount of hydrogen peroxide is required because the peroxide is the ultimate source of the oxygen atom which forms the three-membered epoxide group or oxirane ring with the two carbon atoms adjacent to the original double bond. Thus, for example, in the epoxidation of an oleic acid ester of a monohydric alcohol one mole of hydrogen peroxide is required for complete epoxidation since there is one double bond in the ester or, expressed another way, since there is one mole of unsaturation. Furthermore, two moles of hydrogen peroxide are required to epoxidize completely one mole of a linoleic ester of a monohydric alcohol because linoleic acid contains two double bonds. The same minimum amount, two moles, is needed to epoxidize one mole of an oleic ester of a dihydric alcohol. Ordinarily, an excess of hydrogen peroxide is employed. Such an excess facilitates the course of reaction. An excess of about 0.1 mole over the minimum of one mole, which is required by theory, is usually adequate but the excess may be as much as a full mole, thus making the recommended ratio of peroxide from one to two moles per mole of unsaturation. The commercial grades of hydrogen peroxide are suitable, especially those of about 35–50% concentration.

The presence of an inert solvent such as a saturated aliphatic hydrocarbon, an aromatic hydrocarbon, or a halogenated hydrocarbon is often advantageous in that it tends to repress the formation of by-products. Also, a small amount of alkali of the order of 5% or less on the weight of the formic acid is advantageous for the same purpose, although not essential.

The temperature of reaction can be from 10° C. to 100° C. but it is preferred and recommended that temperatures from 20° C. to 75° C. be maintained. Epoxidation is ordinarily an exothermic reaction and the use of peroxides is frequently dangerous. For these reasons, together with the fact that by-products form at high temperature, it is imperative that the temperature be regulated carefully. As indicated above, however, the process of this invention is far safer and is more easily controlled than other processes proposed heretofore for the epoxidation of the esters of oleic and linoleic acids.

The esters of oleic and linoleic acids which are epoxidized by the process of this invention are those of the monohydric and polyhydric alcohols, typified by the following: Mono-, di- and tri-substituted carbinols such as ethyl, isopropyl, n-butyl, sec.-butyl, tert.-butyl, tert.-amyl, n-octyl, 2-ethylhexyl, octadecyl, lauryl, cyclohexyl, and benzyl alcohols; polyhydric alcohols such as ethyene glycol; 1,2-propylene glycol; 2-ethyl-hexandiol-1,3; butandiol-1,2; butandiol-1,3; butandiol-1,4; dodecandiol-1,12; polyalkylene glycols such as diethylene glycol; glycerol; pentaerythritol; and the isomers and homologues of the above. Esters of a mixture of alcohols are likewise readily epoxidized by this process such as a mixture of ethyl oleate and tert.-butyl oleate or benzyl linoleate and cyclohexyl linoleate or octyl oleate and dodecyl linoleate et cetera. Not only are mixtures of esters operable but mixed esters likewise may be epoxidized. These are typified by ethylene oleate-linoleate, glyceryl dioleate-monolinoleate; butylene linoleate-oleate, and the like. The semi-drying oils, notably soybean oil, which are mixed esters of glycerol and oleic, linoleic and saturated monocarboxylic acids, notably stearic, are particularly included within the scope of this invention. When, for example, soybean oil is epoxidized by the instant process, the double bonds of the glycerol-esterified oleic and linoleic acids are converted to epoxide groups and the presence of the esterified saturated acids has no apparent effect on the course of the epoxidation reaction. The average amount of unsaturation in semi-drying oils, which determines the amount of peroxide and formic acid to be used, is ordinarily known or can be readily determined by standard methods such as a determination of the bromine-number or iodine-number. The esters of substituted alcohols, such as the esters of polyethylene glycols, are operable provided the substituent in the alcohol radical is inert—that is, provided the substituent is unreactive with the peroxidic compounds under the conditions of the epoxidation reaction employed herein. It is also preferred that the radical of the esterified alcohol be free of aliphatic or non-benzenoid unsaturation. Thus, the preferred class of oleic and linoleic acid esters is that class made up of the esters of saturated and unsubstituted alcohols; viz., the alkanols, alkandiols, alkantriols, and alkantetrols.

The following examples serve to illustrate the process of this invention.

Example 1

Two hundred grams of soybean oil (equivalent to 1.1 moles of ethylenic unsaturation) and 16.9 grams (0.33 mole) of 90% formic acid were mixed in a reaction vessel equipped with reflux condenser, thermometer, and mechanical stirrer. While the mixture was agitated, 74.8 grams of 50% hydrogen peroxide (1.1 moles) was added slowly. Throughout the addition, the temperature was maintained at 25°–28° C. by the use of a cooling bath. After about 15 minutes the temperature of the mixture began to rise and was permitted to go only to 42° C. where it was held by cooling. After the exothermic reaction was complete, the mixture was allowed to cool to room temperature where it was held and stirred. Twenty-four hours after the addition of the peroxide, agitation was stopped and the mixture then separated into two layers. The aqueous layer was separated and discarded and the oily layer was neutralized by being washed first with a saturated aqueous solution of sodium bicarbonate and then with water. The oil was then dried at 100° C. under vacuum and was filtered. The yield was 211 grams of a pale yellow oil having a viscosity of 290 centipoises and a color of 2– on the Gardner-Holdt scale. It had an oxirane-oxygen content of 6% as measured by the method of Nicolet and Poulter, as modified by Swern (Ind. & Eng. Chem., Analytical edition, 19, p. 414 (1947).

In a similar experiment which varied from Example 1 only in that the ratio of formic acid was two moles for each mole of ethylenic unsaturation in the soybean oil, the oxirane-oxygen content of the product was only 1.92%. Furthermore, the viscosity of the product was 8700 centipoises, thus indicating the desirability of maintaining the ratio of formic acid at the lowest level which will still permit the reaction to proceed at a reasonable rate.

Example 2

To 302 grams of propylene dioleate (equivalent to 0.5 mole of the ester but equivalent to a full mole of unsaturation since there are two esterified acid radicals in each mole of ester) dissolved in 325 grams of carbon tetrachloride in a reaction flask equipped with thermometer, reflux condenser, and mechanical stirrer, there was added 35.8 grams (0.7 mole) of 90% formic acid. While the mixture was being agitated, 145.7 grams (1.5 moles) of a 35% aqueous solution of hydrogen peroxide was added slowly over a period of one hour. The temperature was maintained between 25° C. and 35° C. and stirring was continued for 24 hours, after which the aqueous and oily layers were separated. The latter was washed and neutralized with a saturated aqueous solution of sodium bicarbonate and the carbon tetrachloride was stripped therefrom under vacuum. The product had an oxirane-oxygen content of 4.65% (as against a theoretical value of 5.0%).

Example 3

To 73 grams of octyl oleate (0.185 mole) was added 4.7 grams of 90% formic acid (0.09 mole). The mixture was stirred and 19.8 grams of 35% hydrogen peroxide (0.2 mole) was added over a five-minute period. The mixture was stirred for 26 hours after which the oily product was separated and dried and described above. The yield was 74.3 grams of a pale yellow, clear liquid having a viscosity of 20 centipoises and an oxirane-oxygen content of 3.45% (as against a theoretical value of 3.9%).

Example 4

In a similar manner the epoxide of methyl oleate was prepared. A mixture of 592 grams (2 moles) of methyl oleate, 34 grams of 90% formic acid (0.66 mole), and 136 grams of 50% hydrogen peroxide (2 moles) was stirred and maintained at 30° C.–40° C. for 24 hours, after which the oily layer was separated from the aqueous layer and washed and dried in the manner described above. The product which weighed 611 grams had an oxirane-oxygen content of 3.48%.

Essentially the same procedure is followed in the epoxidation of other esters of the two acids, such as lauryl oleate or linoleate, butyl oleate or linoleate, cyclohexyl oleate or linoleate, the mono-, di- and tri-oleates and linoleates of glycerol, ethylene dioleate and dilinoleate, benzyl oleate and linoleate, and the like. The success of the invention depends more upon the conditions of reaction and on the ratio of reactants than on the particular ester of oleic or linoleic acids. The process of this invention is such that the epoxidized esters can be produced efficiently, safely, and economically. By the process of this invention the formation of dihydroxy or hydroxyformoxy derivatives of the esters is substantially eliminated and the more desirable epoxy-derivative is obtained.

We claim:

1. A process for the production of epoxidized esters of an unsubstituted alcohol which is free of non-benzenoid unsaturation and at least one of the acids from the group consisting of oleic and linoleic acids, which comprises reacting and epoxidizing said ester with a mixture of hydrogen peroxide and formic acid at a temperature of 10° C. to 100° C., said hydrogen peroxide being present in a ratio of one to two moles for each double bond in each mole of said esterified acid and said formic acid being present in the ratio of 0.25 to 1.0 mole for each double bond in each mole of said esterified acid.

2. A process for the production of epoxidized esters of an unsubstituted alcohol which is free of non-benzenoid unsaturation and at least one of the acids from the group consisting of oleic and linoleic acids, which comprises reacting and epoxidizing said ester with a mixture of hydrogen peroxide and formic acid at a temperature of 20° C. to 75° C., said hydrogen peroxide being present in a ratio of one to two moles for each double bond in each mole of said esterified acid and said formic acid being present in the ratio of 0.25 to 0.75 mole for each double bond in each mole of said esterified acid.

3. A process for the production of epoxidized esters of an unsubstituted alcohol which is free of non-benzenoid unsaturation and oleic acid, which comprises reacting and epoxidizing said ester with a mixture of hydrogen peroxide and formic acid at a temperature of 20° C. to 75° C., said hydrogen peroxide being present in a ratio of one to two moles for each mole of esterified oleic acid and said formic acid being present in the ratio of 0.25 to 0.5 mole for each mole of esterified oleic acid.

4. A process for the production of epoxidized esters of an unsubstituted alcohol which is free of non-benzenoid unsaturation and linoleic acid, which comprises reacting and epoxidizing said ester with a mixture of hydrogen peroxide and formic acid at a temperature of 20° C. to 75° C., said hydrogen peroxide being present in a ratio of two to four moles for each mole of esterified linoleic acid and said formic acid being present in the ratio of 0.5 to 1.0 mole for each mole of esterified linoleic acid.

5. A process for the production of epoxidized mixed esters of an unsubstituted, saturated, aliphatic, polyhydric alcohol and a mixture of oleic and linoleic acids, which comprises reacting and epoxidizing said mixed ester with a mixture of hydrogen peroxide and formic acid at a temperature of 20° C. to 75° C., said hydrogen peroxide being present in a ratio of one to two moles for each double bond in each mole of said esterified acids and said formic acid being present in the ratio of 0.25 to 0.5 mole for each double bond in each mole of said esterified acids.

6. A process for the production of epoxidized mixed esters of glycerol and a mixture of oleic and linoleic acids, which comprises reacting and epoxidizing said mixed ester with a mixture of hydrogen peroxide and formic acid at a temperature of 20° C. to 75° C., said hydrogen peroxide being present in a ratio of one to two moles for each double bond in each mole of said esterified acids and said formic acid being present in the ratio of 0.25 to 0.5 mole for each double bond in each mole of said esterified acids.

7. A process for the production of epoxidized esters of an alkanol and an acid from the group consisting of oleic and linoleic acids, which comprises reacting and epoxidizing said ester with a mixture of hydrogen peroxide and formic acid at a temperature of 20° C. to 75° C., said hydrogen peroxide being present in a ratio of one to two moles for each double bond in each mole of said esterified acid and said formic acid being present in the ratio of 0.25 to 0.5 mole for each double bond in each mole of said esterified acid.

8. A process for the production of epoxidized soybean oil, which comprises reacting and epoxidizing said soybean oil with a mixture of hydrogen peroxide and formic acid at a temperature of 20° C. to 75° C., said hydrogen peroxide being present in a ratio of one to two moles for each mole of unsaturation in said oil and said formic acid being present in the ratio of 0.25 to 0.5 mole for each mole of unsaturation in said oil.

WARREN D. NIEDERHAUSER.
JOSEPH E. KOROLY.

REFERENCES CITED

The following references are of record in the file of this patent:

Findley et al., Jour. of Am. Chem. Soc., pages 412–414, vol. 67, March 1945.
Swern et al., Jour. of Am. Chem. Soc., vol. 61, pp. 1925–27, November 1944.
Swern et al., Jour. of Am. Chem. Soc., vol. 68, pp. 1504–1507, August 1946.
Swern et al., Jour. of Am. Chem. Soc., vol. 67, pp. 1786–1789, October 1945.